United States Patent
Van Buren, Jr.

[15] 3,703,120
[45] Nov. 21, 1972

[54] PLASTIC NUT DEVICE WITH IMPROVED SCREW SEALING AND INSULATING MEANS

[72] Inventor: Harold S. Van Buren, Jr., Lexington, Mass.

[73] Assignee: TRW Inc., Cleveland, Ohio

[22] Filed: Oct. 22, 1970

[21] Appl. No.: 82,922

[52] U.S. Cl. ..................................................85/83
[51] Int. Cl. .......................F16b 13/04, F16b 19/00
[58] Field of Search................85/80, 81, 82, 83, 70; 248/239; 24/73 HS, 73 P

[56] References Cited

UNITED STATES PATENTS

| | | | |
|---|---|---|---|
| 2,887,926 | 5/1959 | Edwards | 24/73 HS |
| 2,562,721 | 7/1951 | Jakosky | 85/82 |
| 2,788,047 | 4/1957 | Rapata | 85/80 |
| 3,105,407 | 10/1963 | Rapata | 85/84 |
| 3,264,699 | 8/1966 | Knowlton | 248/239 |
| 3,334,410 | 8/1967 | Forward | 85/80 |
| 3,342,098 | 9/1967 | Schuplin | 85/83 |
| 3,385,157 | 5/1968 | Rapata | 85/83 |
| 3,469,493 | 9/1969 | Fisher | 85/80 |

FOREIGN PATENTS OR APPLICATIONS

| | | | |
|---|---|---|---|
| 996,455 | 6/1965 | Great Britain | 85/80 |
| 1,122,363 | 8/1968 | Great Britain | 24/73 P |
| 202,089 | 6/1956 | Australia | 85/82 |

*Primary Examiner*—Marion Parsons, Jr.
*Attorney*—Philip E. Parker, James R. O'Connor, Hall & Houghton and Gordon Needleman

[57] ABSTRACT

A one-piece plastic nut device having an integral web for effecting a seal about a screw turned into the nut.

6 Claims, 8 Drawing Figures

PATENTED NOV 21 1972 3,703,120

INVENTOR
HAROLD S. VAN BUREN, JR.
BY
James R. O'Connor
ATTORNEY

PLASTIC NUT DEVICE WITH IMPROVED SCREW SEALING AND INSULATING MEANS

BACKGROUND OF THE INVENTION

1. Field of the Invention

The invention relates to nut devices of the type frequently referred to as "push-in" or "snap-in" nuts. Devices characteristic of the field are primarily but not exclusively found in U.S. Art Class 85, Subclasses 82, 83 and 84 under the general classification heading "Expanding Anchor," and Art Class 151 in the subclasses dealing with nuts having deformable and/or resilient retainers.

2. Description of the Prior Art

While the prior art includes a number of plastic nut devices designed to function in a manner similar to the present invention, one of the most pertinent earlier disclosures is considered to be that found in U.S. Pat. No. 2,788,047 issued to G. M. Rapata. During the past decade hundreds of millions of nuts manufactured according to the teachings of the Rapata patent and equivalents thereof have been sold by the assignee of the patent and its licensees. Usage in the automotive, appliance and construction industries, to mention a few, has been extremely heavy and widespread. During the intervening years artisans have made additions to the basic Rapata design in response to the dictates of particular end use applications. Some of these additions to the basic design have become the subject of improvement patents. However, it is significant to note that attempts to circumvent the scope of the Rapata invention by effecting major design changes which deviate markedly from the nut structure which he disclosed have met with little commercial success. One can of course speculate that the success of Rapata's design is attributable to other than structural and functional factors, but the evidence suggests that, to the contrary, it is the nut (particularly its shank) structure disclosed in the patent and the functional advantages which derive therefrom, as are clearly set forth in the patent specification, which are the principal factors that prompted its extensive acceptance and continuous usage in numerous industrial applications. Thus, past experience indicates that one desiring to complete extensively in this market is well advised to retain many of the desirable features in a plastic nut according to Rapata's teachings, while at the same time seeking to incorporate improvements which would render a new design more attractive to the potential customers. These criteria have been recognized and implemented in the development of the present invention.

Historically, nuts manufactured following the Rapata teachings and equivalents thereof have proved very satisfactory in effecting a seal about the aperture in a workpiece to which the nut is secured in that the head of the nut, or a peripheral bead thereon, or a separate sealing washer disposed thereunder is clamped tightly against the confronting surfaces of the workpiece surrounding the aperture when a screw or the like fastening means is torqued into the nut. More recently however it has become evident that for many applications the entire connection must be effectively sealed, i.e., a seal must be provided about the the screw as well as at the peripheral surfaces of the workpiece aperture, to prevent moisture from traveling through the interior of the nut shank, particularly from the side of the workpiece adjacent the screw head to the remote side thereof. Further, many installations dictate that the screw shank be completely encapsulated to provide effective electrical insulation of same and to protect wiring or other adjacent electrical apparatus from potential piercing by or undesirable contact with the screw shank. Attempts to satisfy these requirements by filling the interior of the nut shank with mastic, foam plastic and other types of separate sealers have generally not provided an optimum solution to the problems and have often precipitated substantial cost increases.

In 1967 U.S. Pat. No. 3,342,098 issued to J. T. Schuplin and disclosed a unitary plastic nut having an integral closed end tube extending from the head of the nut between the deformable shank legs thereof. The Schuplin development has enjoyed some degree of commercial acceptance and is generally considered to have made a definite contribution to the art with respect to its teachings relative sealing and insulating the cooperating threaded element. However, while the Schuplin contribution merits acknowledgment, it has also been recognized that his design has certain deficiencies which motivate one to endeavor to further improve the art. More specifically, in Schuplin's design, the sealing tube has a four-sided polygonal configuration and is joined to the opposed, medial inner surfaces of the shank legs. The sealing tube in effect defines the screw receiving bore in the nut and is the nut element in which complementary threads are formed by the cooperating screw. As the screw is turned into the nut the tube is first expanded and as it expands it precipitates the spreading of the shank legs to secure the nut to a workpiece. In my opinion past experience with nuts of the Rapata type indicates that a nut functions more efficiently in terms of the locking of the nut to the workpiece, thus providing optimum holding power in the fastening, if the complementary threads are formed directly in the opposed internal walls of the thicker and more rigid shank legs, and the forces which expand the legs and retain them in the expanded condition are transmitted directly from the screw element to the legs and not through an intermediate element. I therefore consider this aspect of Schuplin's disclosure somewhat deficient. In another aspect, since the cooperating threaded element cuts or forms complementary threads in the sealing tube per se, which in some sections is significantly thinner than the shank legs, there exists the possibility of the screw actually cutting through, i.e., rupturing, the longitudinal thin walls of the tube and should this happen the purpose of the tube is in effect defeated. In still another aspect, the closed end of the Schuplin sealing tube projects substantially beyond the ends of the shank legs remote from the head of the nut and is thus exposed and subject to puncture, for example, by a sharp projection or burr at the edge of a metallic workpiece aperture during initial seating of the fastener in the workpiece. Such piercing or puncturing might well occur absent any knowledge thereof by one installing the nut, particularly in a so-called "blind" application. Also, due to the fact that the closed end of the sealing tube extends beyond the leading ends of the shank legs, coupled with the fact that the legs diverge substantially between the nut head and their leading ends, each of the leading edges of the legs presents a pronounced projection rearwardly of the closed end of the sealing tube and is thus subject to accidental jamming or binding on the edge of a workpiece aperture during nut insertion, particularly if the nut is tipped or canted with respect to the aperture. One can readily see that such jamming or binding while the nut is being thrust into the workpiece may precipitate a tearing or shearing of one or more of the shank legs from the medial longitudinal portions of the sealing tube. Once again, any shearing or tearing would of course impair the effectiveness of the seal and might occur absent detection at the time of installation.

It is therefore submitted that one who now proceeds to consider the detailed description of a preferred embodiment of the present invention which follows will recognize that the invention eliminates the aforementioned deficiencies in the Schuplin design while at the same time retaining many of the desirable features of the Rapata teachings and thus represents a definite improvement in the art under consideration.

SUMMARY OF THE INVENTION

A one-piece, plastic nut has a head portion with an opening therethrough, a shank portion defined by opposed, spaced legs depending from the head portion and having an internal bore communicating with the opening in the head portion. The shank is adapted to be snap seated in an apertured workpiece and locked to the workpiece by spreading deformation of the legs responsive to the threading of a cooperating screw or bolt into the said internal bore. The nut also includes means for effecting a seal about the threaded element. The sealing means is in the form of a web having a generally sinuous cross-sectional configuration which is joined to the nut head and the legs defining the shank and has a closed end spaced from the head. The sealing web is disposed substantially within the peripheral limits of the nut shank defined by the sides and ends of the deformable legs thereof.

DESCRIPTION OF A PREFERRED EMBODIMENT

Figure 1:
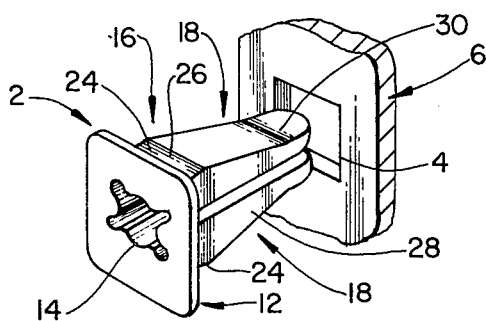
FIG. 1 is a perspective view of a preferred embodiment of a nut device according to the invention in position to be inserted into an appropriately sized and shaped aperture in a fragmentarily depicted portion of a workpiece.
Figure 2:
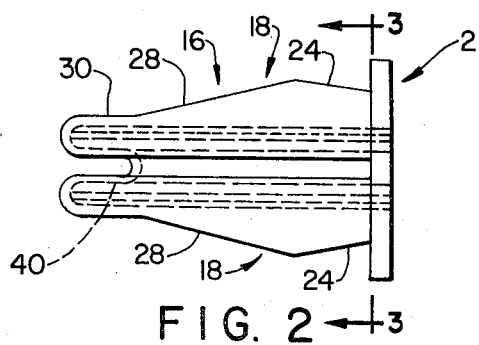
FIG. 2 is a side elevational view of a nut device according to the invention.
Figure 3:
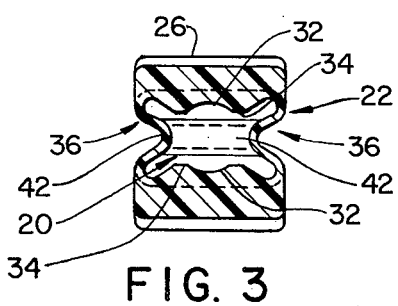
FIG. 3 is a section taken on line 3—3 of FIG. 2.
Figure 4:
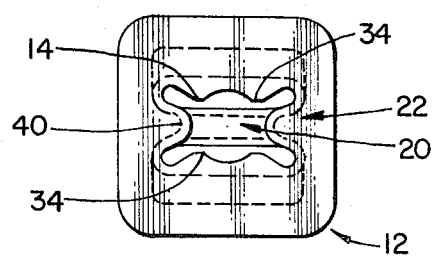
FIGS. 4 and 5 are top and bottom plan views, respectively, of the improved nut device.

Reference should now be had to the accompanying drawing wherein there is illustrated a preferred form of a nut device 2 which is formed unitarily, preferably by molding, of a synthetic plastic material, such as nylon. The nut 2 is adapted for snap seating in an aperture 4 in a workpiece 6 and is intended to receive a self-threading screw or bolt 8 to fasten an apertured member 10 to the workpiece.

The nut 2 includes a head 12 having an opening 14 extending therethrough, a shank 16 depending from the head, the shank being defined by a pair of opposed legs 18 having an internal bore 20 communicating with the opening 14 in the head, and a sealing web 22 joined to both the head and the legs 18.

The shank legs 18 taper outwardly and divergently adjacent the head 12 to provide inclined surfaces 24 which are adapted to engage behind the workpiece 6 when the legs are spread outwardly by the screw 8. The outwardly inclined surfaces 24 terminate in opposed shoulders 26 and the legs thereafter taper inwardly to provide converging camming surfaces 28 which facilitate snap seating of the nut in the apertured workpiece 6. From the termination of the inwardly tapering portions, the legs continue to their ends remote from the head in generally straight portions 30, the outer flat surfaces of which are spaced apart a distance appreciably less than the distance across the surfaces 24 adjacent the head. The narrower end of the shank defined by leg portions 30 greatly facilitates initial alignment with and insertion of the shank 16 into the aperture 4 in the workpiece.

It will be observed that the aperture 4 in the workpiece is essentially of rectangular shape and that the shank 16 of the nut is of corresponding configuration to inhibit rotation of the nut device relative to the workpiece during application of the screw 8. For purposes of illustration only, the head 12 of the nut is depicted having a rectangular configuration. Further the addition of an underlip or bead at the periphery of the head or the affixing of a sealing washer thereto or the forming of a concavity in the head or some other additional means to increase its effectiveness in sealing the aperture in the workpiece are all considered to be well-known adaptations in the art which might be incorporated without departing from the scope of the present invention.

The internal medial portions of the legs 18 are provided with opposed longitudinally extending grooves 32 forming axial continuations of portions of the periphery of the opening 14 in the head 12. Ideally, the diameter of a circle defined by the grooves 32, which at least partially define the internal bore 20 in the shank 16, is approximately equal to the minor diameter of the threaded portion of the screw 8. Each of the legs 18 is also provided with a pair of longitudinally extending ribs 34 lying outboard the lateral extremities of the grooves 32. The purpose of the grooves 32 and ribs 34 will be explained in further detail hereinafter. One will further note that the legs 18 defining the nut shank are of increased thickness, and thus more rigid adjacent the head 12, particularly those leg portions adjacent the shoulders 26, and still further that the legs are thinner, and thus more resilient, adjacent the termination of the inwardly converging portions 28 and the straight terminal ends 30.

As is best depicted in FIGS. 3 through 6, the sealing web 22 is continuous and has a generally sinuous configuration as viewed in cross section, and includes side portions 36 joined to the head 12 and the opposed shank legs 18 adjacent the outer marginal edges thereof and extending longitudinally along said edges, and a closed end portion 38 which is joined to the terminal ends of the leg portions 30 and extends therefrom back toward the head 12 in an inverted, generally U-shaped bight portion 40 extending transversely between the legs 18 in spaced relation to the internal surfaces thereof. The longitudinal side portions 36 of the web extend inwardly toward the longitudinal axis of the bore in the shank along reversely oriented arcuate paths, the peaks 42 of which are spaced from the said axis a distance approximately equal to or slightly less than the radius of a circle defined by the opposed grooves 32 in the shank legs. Thus, as is clearly seen in the drawing, the sealing web 22, in its entirety, is disposed, both lengthwise and widthwise, substantially within the protective confines of the sides and ends of the shank legs 18.

The nut device 2 is initially assembled with the workpiece 6 by simply inserting the shank, with leg portions 30 leading, into the opening 4 and pressing the head 12 toward the workpiece until the shoulders 26 on the shank snap through the opening. As the edges of the workpiece opening ride over the camming surfaces 28 and the shoulders 26, the side portions 36 and closed end portion 38 of the sealing web are collapsed inwardly in accordianlike fashion with the peaks 42 of the former deflecting toward each other and the axis of the bore 20. When the shoulders 26 have cleared the remote surface of the workpiece, the aforesaid web sections tend to dilate back to the condition depicted in FIGS. 2 through 5 and thereby tend to exert a reinforcing bias which enhances the gripping engagement of the workpiece by the nut, which engagement is sufficient to retain the nut in assembly under normal conditions of usage.

Immediately after initial snap seating of the nut in the workpiece, or at any convenient time thereafter, the member 10 to be fastened is positioned against the outer surface of the nut head 12 with the opening 46 in the member in registration with the opening 14 in the head. The member 10 is thereafter secured to the workpiece by means of the self-threading screw or bolt 8, the threaded shank of which is screwed directly into the unthreaded bore 20 in the nut shank. As the threaded screw shank is advanced into the bore 20, the screw threads cut or form complementary threads in the inner surfaces of the shank legs defining the grooves 32 and in the ribs 34 adjacent the grooves, with the ribs and grooves serving as a guide means for the leading end of the screw to prevent skewing of same as it advances into the bore. Since, as was earlier stated, the diameter of a circle defined by the grooves 32 is approximately equal to the minor diameter of the screw shank, the screw threads deformably spread the legs 18 apart and in effect lock the inclined surface 24 thereof behind the remote surface of the workpiece 6. As FIGS. 6 and 7 most clearly depict, the spreading of the shank legs precipitates an outward deflection or straightening of the side portions 36 of the web, thereby decreasing the radius of the bend at peaks 42, and a similar although transverse diverging deflection of the closed end 38 of the web about the bight portion 40. Finally, as the head 48 of the screw is drawn inwardly and tightened against the member 10, the latter clamps the head 12 of the nut tightly against the confronting surface of the workpiece adjacent the opening 4, thereby effecting a complete sealing of the opening against the passage of moisture therethrough from either side of the workpiece.

While various factors including the thickness of the member 10 to be attached and the size, particularly the length, of the nut 2 will determine the size and type of self-threading screw or bolt to be employed in a given installation, the screw selected should ideally be of such length that its leading end will be disposed adjacent the back of the bight portion 40 at the closed end of the sealing web when the screw is fully seated in order to achieve the formation of a maximum number of complementary threads in the nut shank. This optimum condition is clearly depicted in FIG. 6.

Figures 5, 6:
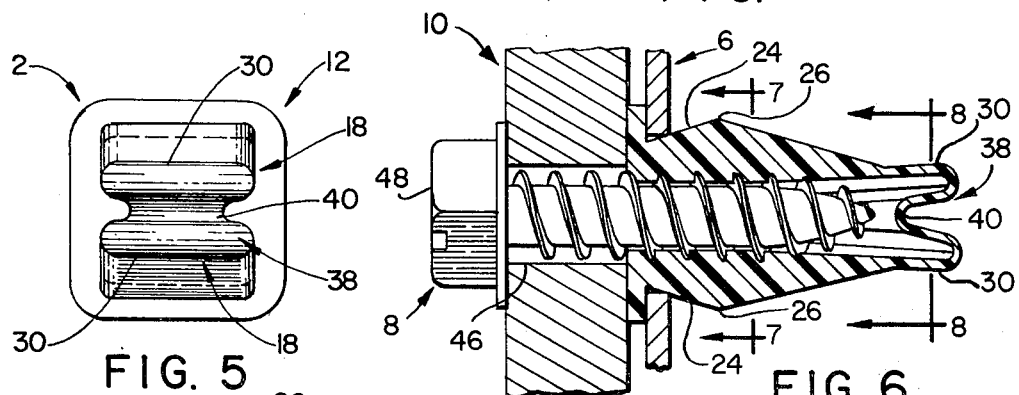
FIG. 6 is a vertical cross-sectional view depicting the nut device secured in a workpiece by a screw (shown in full) with the screw head anchoring a second apertured member to the workpiece.

From a further consideration of FIG. 6, the reader will appreciate that full depth complementary threads are cut or formed in the thicker, more rigid portions of the shank legs adjacent the head, which portions are backed up by the walls of the opening 4 in the workpiece, and that less than full depth threads are formed in the inwardly converging leg portions 28 which are thinner and thus more resilient, particularly at their ends remote from the head, both due to the increased resiliency of the converging portions of the legs and the fact that the leading end of the screw or bolt carries threads of less than full height. In the earlier mentioned U.S. Pat. No. 2,788,047, Rapata clearly depicted and described the aforementioned variation in the depth of the complementary threads formed along the length of his nut and correctly pointed out that even partial depth threads formed in the shank of nuts of this type are effective to grip and lock the screw against retrograde movement. However, Rapata further commented that it was desirable in the type of nut he disclosed to drive the screw shank through and beyond the deformed legs of the nut to insure that full depth threads on the screw oppose the more flexible ends of the shank legs. Obviously the present invention is not conducive to driving the screw completely through the nut shank as this would rupture the closed end of the sealing web. However, one will note, particularly from FIG. 6, that the loss of this capability in the present invention is to a significant degree compensated for by the fact that the closed end of the sealing web maintains a constant inward bias or tension on the shank legs to enhance the gripping action between the partial and full depth threads adjacent the leading end of the screw and the complementary threads formed thereby in the adjacent portions of the shank legs.

Figure 7:
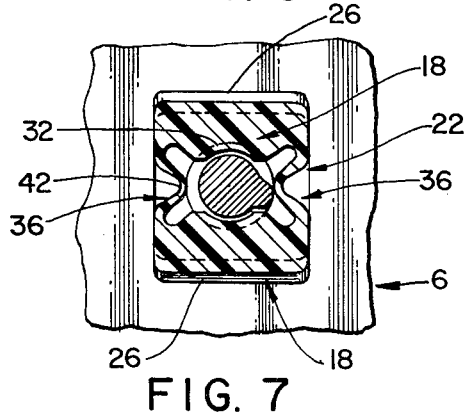
FIGS. 7 and 8 are transverse cross-sectional views taken on lines 7—7 and 8—8, respectively, of the assembly depicted in FIG. 6.
Figure 8:
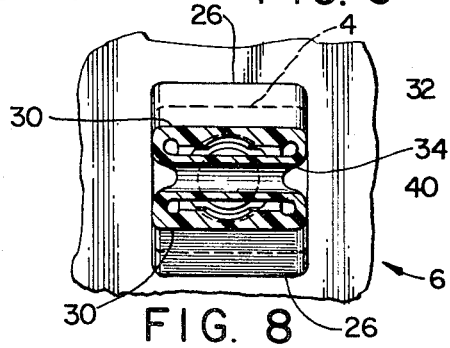

With respect to the assembly as depicted in FIGS. 6, 7 and 8, it should also be pointed out that by reason of the fact that the initial spreading deformation of the legs responsive to the threaded engagement of the walls thereof by the leading thread convolutions on the screw during insertion precipitates an immediate corresponding lateral deflection, as aforesaid, of the side portions 36 of the web. This expansion of sides of the web coupled with limited axial penetration of the screw shank (as seen in FIG. 6), results in minimal, if any, engagement of the web by the screw, thereby substantially reducing the possibility of undesirable web rupture.

Having considered the foregoing detailed description of a preferred embodiment, the reader should now appreciate that the design objectives earlier set forth have been realized. One should now look to the claims which follow for a more precise definition of the scope of the invention.

I claim:

1. In a plastic nut device of the type having a head portion with an opening therethrough and a shank portion defined by two or more legs depending from said head portion and having an internal bore communicating with the opening in the head portion and wherein said shank is adapted to be snappingly received through an appropriately sized and shaped aperture in a workpiece and locked to the workpiece upon spreading deformation of the shank legs responsive to the threading of a screwlike means through the opening in said head portion and into threaded engagement with the walls of the shank defining the bore therein and wherein a seal is effected at the peripheral edges of the aperture in the workpiece by the drawing of the head portion of the nut toward the confronting surfaces of the workpiece adjacent the aperture therein responsive to the threading of the screwlike means into the nut, the improvement comprising means for effecting a seal about the screwlike means, said means being in the form of an integral plastic web having a generally sinuous cross-sectional configuration, said web including longitudinal portions joined to the head portion and to opposed inner surfaces of the shank legs adjacent the outer marginal edges of the shank and extending inwardly from said marginal edges toward the longitudinal axis of said bore, whereby said web portions are adapted to be collapsed inwardly and toward said axis during snap seating of the nut in an apertured workpiece and expanded outwardly and away from said axis upon spreading deformation of the legs by a screwlike means, and a closed end portion merging with said longitudinal portions in a transverse bight spaced between the inner surfaces of the shank legs and disposed appreciably, axially inwardly toward said head portion from the remote end of the shank.

2. In a plastic nut device of the type having a head portion with an opening therethrough and a shank portion defined by two or more legs depending from said head portion and having an internal bore communicating with the opening in the head portion, and wherein the shank is adapted to be snappingly received through an appropriately sized and shaped aperture in a workpiece and locked to the workpiece upon spreading deformation of the shank legs responsive to the threading of a screwlike means through the opening in the head portion and into threaded engagement with the walls of the shank defining the bore therein, the improvement comprising means for effecting a seal about the screwlike means, said means being in the form of an integral, continuous web having a closed end portion and longitudinally extending side portions joined to the head of the nut and extending from the head along and between opposed portions of the shank legs adjacent the outer marginal edges of the said legs, said side portions of said web being in opposing relationship to each other and having a reversely oriented, generally sinuous cross-sectional configuration with the peak of each side portion being disposed inwardly of the opposed edges of the shank legs toward but substantially spaced from the longitudinal axis of the said bore and spaced from the adjacent internal surfaces of the shank legs, said closed end portion having a generally inverted U-shaped configuration as viewed in a longitudinal cross section of the nut, the apex of said closed end portion merging with said side portions and lying appreciably axially inwardly toward said head from the ends of said shank legs remote from said head, whereby said web is contracted, in accordianlike fashion with the peaks of said longitudinal portions being deflected toward each other and the said axis of the bore, during snap seating of the nut in an apertured workpiece, and expanded in accordianlike fashion with the said peaks diverging from each other and the said axis of the bore, responsive to subsequent spreading deformation of the shank legs by a screwlike means.

3. A nut device according to claim 2 wherein said closed end portion of said web is joined to the shank legs proximate their ends remote from the head of the nut and extends between the legs in a sinuous cross-sectional configuration defining a reversely bent terminal bight extending transversely between but spaced from the internal medial surfaces of the shank legs, whereby said closed end portion is adapted to deflect inwardly about said bight during snap seating of the nut in a workpiece and to divergingly expand about said bight responsive to spreading deformation of the shank legs by a screwlike means.

4. A one-piece plastic nut device comprising a head portion having an opening therethrough, a shank portion defined by a pair of opposed, spaced substantially parallel legs depending from said head portion and having an internal bore communicating with the opening in said head portion, said shank portion being adapted to be snap seated in an apertured workpiece and locked to the workpiece by spreading deformation of said legs responsive to the threading of a screwlike means into the said internal bore, and means for effecting a seal about the screwlike means, said sealing means being in the form of an integral continuous web including longitudinal and transverse portions, said longitudinal portions being joined to the head of the nut and the shank legs adjacent the outer marginal edges of the legs and extending directly between each of said legs of the pair of legs along a substantially sinuous path, the external surfaces of said longitudinal web portions lying substantially between said legs and transversely inwardly of the peripheral surfaces of said legs, said transverse web portion being joined to the ends of said legs remote from said head portion and providing a bore end closure and extending from said juncture with said legs back toward said head portion in spaced relationship to the inner transverse surfaces of said legs and merging with said longitudinal web portions at points spaced appreciably axially inwardly toward said head portion from the ends of said legs remote from said head portion.

5. A nut device according to claim 4 wherein the distance across the outermost external surfaces of the nut adjacent the end of said shank remote from said head is appreciably less than the distance across the corresponding external surfaces of said nut at the end of said shank proximate said head portion.

6. A nut device according to claim 5 wherein the said outermost external surfaces of said nut adjacent the end of said shank remote from said head portion are substantially parallel.

* * * * *